US010509292B1

(12) United States Patent
Bass et al.

(10) Patent No.: US 10,509,292 B1
(45) Date of Patent: *Dec. 17, 2019

(54) MANUFACTURING METHODS FOR A TRANSPARENT CONDUCTIVE OXIDE ON A FLEXIBLE SUBSTRATE

(71) Applicant: Kinestral Technologies, Inc., South San Francisco, CA (US)

(72) Inventors: John David Bass, South San Francisco, CA (US); Howard Bergh, South San Francisco, CA (US); Nicolas Timmerman, South San Francisco, CA (US); Jonathan Ziebarth, South San Francisco, CA (US)

(73) Assignee: Kinestral Technologies, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,972

(22) Filed: May 22, 2017

Related U.S. Application Data

(63) Continuation of application No. 14/994,094, filed on Jan. 12, 2016, now Pat. No. 9,658,508.

(60) Provisional application No. 62/102,505, filed on Jan. 12, 2015.

(51) Int. Cl.
*G02F 1/163* (2006.01)
*G02F 1/153* (2006.01)

(52) U.S. Cl.
CPC ............ *G02F 1/163* (2013.01); *G02F 1/1533* (2013.01); *G02F 2001/1635* (2013.01)

(58) Field of Classification Search
CPC .................. G02F 1/163; G02F 1/1533; G02F 2001/1635; G02F 1/15
USPC .......................... 359/265–275, 900; 345/105
See application file for complete search history.

(56) References Cited

U.S. PATENT DOCUMENTS

2009/0078917 A1* 3/2009 Percec ..................... C09K 9/02
252/583

* cited by examiner

*Primary Examiner* — Tuyen Tra
(74) *Attorney, Agent, or Firm* — Womble Bond Dickinson (US) LLP

(57) ABSTRACT

An electrochromic device is provided. The device includes a substrate and an electrochromic stack on the substrate. The stack includes a first set of bus bars, a first transparent conductive layer, at least one electrochromic layer, a second transparent conductive layer, and a second set of bus bars, wherein at least one of the first transparent conductive layer or the second transparent conductive layer includes resistivity that varies by horizontal location according to a resistivity profile. In some embodiments the resistivity profile has a vertical component that may or may not be in addition to the horizontal component. Various embodiments of these materials can be tuned as to profiles of vertical resistance and horizontal sheet resistance.

25 Claims, 8 Drawing Sheets

MANUFACTURING METHODS FOR A TRANSPARENT CONDUCTIVE OXIDE ON A FLEXIBLE SUBSTRATE

FIELD OF THE INVENTION

The present invention generally relates to switchable electrochromic devices with flexible substrates, such as for architectural windows, capable of coordinated switching over substantially their entire area or a selected subregion of their entire area. More particularly, and in one embodiment, the present invention is directed to switchable electrochromic multi-layer devices with flexible substrates, particularly for large area rectangular windows for architectural applications that switch in a spatially coordinated manner over substantially their entire area or a selected subregion of their entire area; optionally these are of non-uniform shape, optionally they switch synchronously, i.e., uniformly, over substantially their entire area or a selected subregion of their entire area, or in a coordinated but nonsynchronous manner (e.g., from side-to-side, or top-to-bottom) from a first optical state, e.g., a transparent state, to a second optical state, e.g., a reflective or colored state.

BACKGROUND

Electrochromic devices, such as electrochromic windows or automotive electrochromic rearview mirrors, change transmissivity with application of voltage and current. The process relies on electrochemical redox (reduction, or gain of electrons and decrease in oxidation state, and oxidation, or loss of electrons and increase in oxidation state) reactions of a material, and is reversible. Cathodic electrochromic materials color or darken cathodically by a reduction process, i.e., when gaining electrons and bleach when giving up electrons. Anodic electrochromic materials color or darken anodically by an oxidation process, i.e., when giving up electrons and bleach when gaining electrons. Ion transmissive (i.e., ion conductive) materials allow ions to travel from one type of electrochromic material to another. Some electrochromic stacks use a cathodic electrochromic material, an ion transmissive material and an anodic electrochromic material.

Electrochromic materials are often slow to change transmissivity, and may do so unevenly in large devices such as electrochromic windows. Gradual, non-uniform coloring or switching is a common problem associated with large area electrochromic devices. This problem, commonly referred to as the "iris effect," is typically the result of the voltage drop through the transparent conductive coatings providing electrical contact to one side or both sides of the device. For example, when a voltage is initially applied to the device, the potential is typically the greatest in the vicinity of the edge of the device (where the voltage is applied) and the least at the center of the device; as a result, there may be a significant difference between the transmissivity near the edge of the device and the transmissivity at the center of the device. Over time, however, the difference in cell potential between the center and edge decreases and, as a result, the difference in transmissivity at the center and edge of the device decreases. In such circumstances, the electrochromic medium will typically display non-uniform transmissivity by initially changing the transmissivity of the device in the vicinity of the applied potential, with the transmissivity gradually and progressively changing towards the center of the device as the switching progresses. While the iris effect is most commonly observed in relatively large devices, it also can be present in smaller devices that have correspondingly higher resistivity conducting layers.

Another problem with electrochromic materials is that manufacturing methods for electrochromic glass may not be suitable for other materials, especially flexible materials, as substrates, especially since glass has a relatively high melting point as compared to such materials. In particular, standard transparent electrically conductive materials used in electrochromic devices (e.g., transparent conductive oxides, TCOs, such as indium tin oxide, or fluorine doped tin oxide) require high processing temperatures to achieve a combination of low electrical resistance and high transparency. When these standard materials are employed on flexible substrates with limited processing temperatures, then the resistance is higher and/or the transparency is higher. The higher resistance of the electrically conductive layer exacerbates the iris effect because the resistance between the edge and center of the device is larger.

Therefore, there is a need in the art for a solution which overcomes the drawbacks described above, including manufacturing electrochromic devices with spatially coordinated switching on flexible substrates.

SUMMARY

In some embodiments described in this disclosure, an electrochromic device is provided including at least one flexible substrate and an electrochromic stack on the substrate. The stack includes a first set of bus bars, a first transparent conductive layer, at least one electrochromic layer, a second transparent conductive layer, and a second set of bus bars.

In some cases, at least one of the first transparent conductive layer or the second transparent conductive layer has low resistance and high transmission. At least one of the first transparent conductive layer or the second transparent conductive layer can include conductive wires with small diameters, which do not significantly impact the optical transmission of the layer.

In some cases, at least one of the first transparent conductive layer or the second transparent conductive layer includes sheet resistance that varies by horizontal location according to a sheet resistance profile. In some embodiments, the first and/or second transparent conductive layer includes one or more layers of materials with different resistivity, and the resistance profile has a vertical component that may or may not be in addition to the horizontal component. Various embodiments of the materials making up the electrically conductive layer(s) can be tuned as to profiles of vertical electrical resistance and horizontal sheet resistance.

The electrochromic and ion conducting materials in the electrochromic stack may also be processed at low temperatures to be compatible with flexible substrates, and the electrically conductive materials in the stack. In some cases, the electrochromic materials are deposited from a particulate slurry. In some cases, the ion conductor has a polymer matrix.

Methods are also disclosed for producing electrochromic devices with low resistance and high light transmissive electrically conductive layers on flexible substrates. Methods are also disclosed for producing electrochromic devices on flexible substrates where at least one of the first and/or second transparent conductive layer includes sheet resistance that varies by horizontal location according to a sheet resistance profile. Methods are also disclosed for producing electrochromic devices roll-to-roll (i.e. roll to roll, or R2R).

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments. It is expressly stated that these drawings are not to scale.

FIG. 11b is an overhead view showing patterning of the lower transparent conductive oxide and conductive or resistor layer of FIG. 11a.

DETAILED DESCRIPTION

Electrochromic Devices on Flexible Substrates

Figure 1:
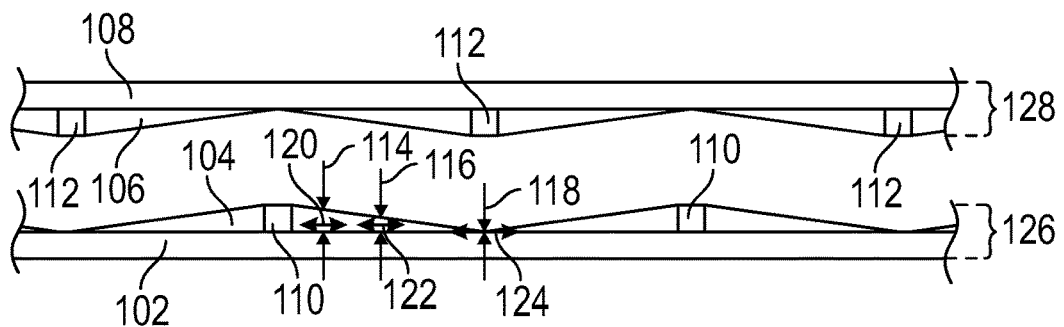
FIG. 1 is a cross-section view of a transparent conductive layer and bus bars, on a substrate, for an electrochromic device.

A variety of materials and manufacturing techniques are herein disclosed for making electrochromic devices, and particularly transparent conductive oxides and other transparent conductive layers, on various substrates, including flexible substrates. In some cases, these materials and manufacturing techniques are suitable for use on large or small areas of glass as a substrate, and in some cases are suitable for use on large or small areas of flexible substrates. Some examples of flexible substrates are plastic substrates made from materials such as polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers.

Transparent conductive layers with uniform horizontal sheet resistance and uniform vertical resistance are known for use in electrochromic devices. The sheet resistance ($R_s$) of a layer is defined as the bulk resistivity ($\varphi$) divided by the thickness (t) of the layer. In other words, $R_s = \rho/t$, and layers with higher bulk resistivity, and/or that are thinner, will generally have higher sheet resistances. However, many of the materials typically used for glass substrates require high processing temperatures to reduce the sheet resistance and improve the transmission. For example, transparent conductive oxides (TCOs) are commonly used as electrically conductive layers for electrochromic devices. TCOs are typically deposited on glass by sputtering, with substrate temperatures greater than the maximum tolerable temperatures of most flexible substrates (e.g., greater than 300° C.). TCOs that are deposited on flexible substrates with lower than optimal deposition temperatures, typically have inferior sheet resistance and/or transmission compared to TCOs on glass, which leads to exacerbated iris effects.

Electrochromic devices on flexible substrates can employ alternative transparent conductive materials that are be deposited at lower temperatures and still achieve low sheet resistance and high transmission. Some examples of low temperature low sheet resistance transparent conductive materials are wire meshes (e.g., copper wire meshes), nanowire meshes (e.g., silver nanowire meshes), carbon nanotube meshes, particulate coatings (e.g., TCO particles), and nanoparticulate coatings (e.g., nanographite coatings and graphene coatings).

In some cases, the low temperature low sheet resistance transparent conductive material can be deposited by solution deposition techniques. Some solution deposition techniques include slot die coating and spray coating, however many solution deposition techniques could be suitable. In some cases the low temperature low sheet resistance transparent conductive material can be deposited with a binder (e.g., a polymeric material), which serves to provide mechanical stability and/or adhesion to the layer. In some cases the low temperature low sheet resistance transparent conductive material can be deposited without a binder.

In some cases, electrochromic devices on flexible substrates can employ composite transparent conductive layers. For instance a thin layer of a TCO can be deposited at low temperature, and a low temperature low sheet resistance transparent conductive material can be deposited on top of the TCO. Some examples of such composite layered structures are a thin layer (e.g., 10 to 100 nm) of indium tin oxide deposited at temperatures tolerable by the flexible substrate, and a silver nanowire mesh solution deposited on top.

Processing flexible plastic substrates is limited by the melting point of the substrate, which is typically lower than the melting temperature of glass. Also, the requirement for flexibility may lead to thinner materials to avoid cracking of the material during flexure. These low temperature and/or thinner materials typically have higher sheet resistance than electrically conductive layers on glass substrates. For these reasons, prior attempts at producing electrochromic devices on flexible substrates have often been limited to smaller area devices, and attempts at larger area devices have shown exaggerated bull's-eye effect (i.e., iris effect). Some embodiments of the presently disclosed materials are on large area flexible substrates, such as a web used in roll to roll processing, and can be cut to various sizes. These embodiments have greatly reduced or eliminated bull's-eye effect as a result of the reduced sheet resistance offered by the low temperature low sheet resistance transparent conductive materials described herein, in one or more transparent conductive layers.

Alternatively, the iris effect can be mitigated by varying the vertical resistance and/or horizontal sheet resistance that varies according to horizontal location in transparent conductive layers. Presently disclosed materials and manufacturing techniques allow control of vertical resistance and/or horizontal sheet resistance that varies according to horizontal location in transparent conductive layers. Various embodiments are described to tune the profiles of vertical resistance and/or horizontal sheet resistance of transparent conductive layers on glass and flexible substrates, to decrease or eliminate the bull's-eye effect (i.e., the iris effect), which result in a more uniform change in transmissivity across even large structures as compared to electrochromic devices made with uniform transparent conductive layers. In various embodiments, these profiles have variations in vertical resistance and/or horizontal sheet resistance over a range of two to one, ten to one, one hundred to one, or other range between these ranges or outside of these ranges, as specific to tuning. It should be appreciated that a transparent conductive layer can be a compound layer having multiple layers and/or multiple materials. Similarly, an electrochromic layer can be a compound layer, having multiple layers and/or multiple materials.

Electrochromic Devices on Flexible Substrates with Non-Uniform Electrically Conductive Layers FIG. 1 is a cross-section view of a transparent conductive layer 104 and bus bars 110, on a substrate 102, for an electrochromic device. The electrochromic device may also have a broader definition as the flexible substrate web on which the full electrochromic device stack and sets of bus bars have been formed prior to the cutting of the individual electrochromic devices have a first bus bar and a second bus bar. Thickness of the transparent conductive layer 104 varies in a controlled manner from thick near each of the bus bars 110 to thinner further away from each of the bus bars 110 to thinnest at some point between adjacent bus bars 110 of that conductive layer 104. The thinnest portion of the transparent conductive layer 104 is approximately at a midpoint between these adjacent bus bars 110, in this example. These layers form a lower substrate 102, transparent conductive layer 104 and bus bars 110 structure 126 for an electrochromic device. Relative directions oriented to the plane of the substrate are used for convenience of reference in describing devices herein, but it should be appreciated that these are independent of gravity or orientation of the device relative to gravity.

An upper substrate 108, transparent conductive layer 106 and bus bars 112 structure 128 is formed in a similar manner and has similar characteristics, except that the lower structure 126 and the upper structure 128 are aligned such that the thinnest region of the transparent conductive layer of the upper substrate aligns with the bus bar on the lower substrate, and vice-versa. That is, the thickest portion of the upper transparent conductive layer 106 lines up with the thinnest portion of the lower transparent conductive layer 104, and the thinnest portion of the upper transparent conductive layer 106 lines up with the thickest portion of the lower transparent conductive layer 104. Upper bus bars 112 and lower bus bars 110 are interleaved, so that no upper bus bar 112 aligns with a lower bus bar 110. In other words, each upper bus bar 112 is between two lower bus bars 110, and each lower bus bar 110 is between two upper bus bars 112, when viewed from above. Interleaving of bus bars 110, 112, and a pattern of material of varying horizontal sheet resistance and vertical resistance between bus bars 110, 112 could repeat across many multiples of bus bars 110, 112.

To complete an electrochromic stack, a cathodic electrochromic material, an ion conductive layer, and an anodic electrochromic material (not shown in FIG. 1, but see FIGS. 11a, 12 and 13) are layered between the lower structure 126 and the upper structure 128 described above, in one embodiment. Alternatively, the cathodic and anodic electrochromic material and the ion conductor may be a single mixed layer which may be a particle-based material.

In some cases, the down web direction in FIG. 1 is in the plane of the paper (not out of plane). In other words, in some cases the roll is moving from left to right, or from right to left in the figure. In some cases, the upper and lower rolls would be cut to bisect the bus bars 110 and 112 to form the individual devices. This would create a final device with two bus bars, at opposite edges of the device, with one bus bar creating an electrical connection to the electrically conductive layer of one substrate, and the second bus bar creating an electrical connection to the electrically conductive layer of the other substrate.

Sheet resistance of these materials can be measured or simulated in various ways, and varies according to horizontal location. Horizontal sheet resistance can be measured by placing probes at differing horizontal locations on the transparent conductive layer 104. A first horizontal sheet resistance 120, close to a bus bar 110, is lower than a second horizontal sheet resistance 122, further from the bus bar 110, and both of these are lower than a third horizontal sheet resistance 124 midway between the bus bars 110. This is because the bulk resistivity of the transparent conductive layers is approximately constant as a function of horizontal location, and the thickness of the layer(s) varies as a function of horizontal location. The thickness of the transparent conductive layer 104 is thicker close to the bus bar 110, which gives rise to lower horizontal sheet resistance, and thinner midway between the bus bars 110, which gives rise to higher horizontal sheet resistance. A profile of the horizontal sheet resistance of the transparent conductive layer 104 of the lower structure 126 goes from lower horizontal sheet resistance to higher horizontal sheet resistance, to lower horizontal sheet resistance, from one bus bar 110 to the next bus bar 110. A profile of the horizontal sheet resistance of the transparent conductive layer 106 of the upper structure 128 is similar.

Vertical resistance can be measured by placing probes at differing vertical locations on the transparent conductive layer 104 (e.g., at an upper surface and a lower surface), aligned at a single horizontal location. A first vertical resistance 114, close to a bus bar 110, is higher than a second vertical resistance 116, and both of these are higher than a third vertical resistance 118 midway between the bus bars 110. This is because the thickness of the transparent conductive layer 104 is thicker close to the bus bar, which gives rise to a higher vertical resistance, and thinner midway between the bus bars 110, which gives rise to a lower vertical resistance.

In different cases, the thickness profile of the transparent conductive layer(s) (e.g., 104 and/or 106 in FIG. 1) can be tuned in various ways, to produce various voltage profiles, current flows and effects on the rate of change of transmissivity of an electrochromic device at various horizontal locations.

The thickness, horizontal sheet resistance and vertical sheet resistance can all affect current flow in an electrochromic device. The degree to which they affect current flow can depend on multiple factors such as the bulk resistivity of material(s) used in the transparent conductive layer 104, maximum thickness, minimum thickness, ratio of maximum thickness to minimum thickness of the layer, and thickness profile of the transparent conductive layer 104 in various directions parallel to the substrate 102 (i.e., relative flatness or curvature of the shape of the thickness profile relative to horizontal location).

With reference to the structure depicted in FIG. 1, one of the principles that can be applied to a completed electrochromic device is to have complementary regions of lateral sheet resistance aligned in the lower structure 126 and the upper structure 128. For example, a region of lower horizontal lateral sheet resistance in the lower structure 126 aligns with a region of higher horizontal sheet resistance in the upper structure 128. A region of higher horizontal sheet resistance in the lower structure 126 aligns with a region of lower horizontal sheet resistance in the upper structure 128. Horizontal sheet resistance gradients are complementary as well, in that the horizontal sheet resistance has a decreasing gradient in direction in one section of the lower structure 126 that opposes a section in the upper structure 128 of increasing horizontal sheet resistance gradient in the same direction, and an increasing horizontal sheet resistance gradient in a further section and direction of the lower structure 126 opposes a decreasing horizontal sheet resistance gradient in a corresponding section and direction of the upper structure 128. This principle can also be observed in the embodiments shown in FIGS. 11a-13, and in other geometries not shown.

For a rectangular top electrically conductive layer, and a rectangular bottom electrically conductive layer (where the sides of the rectangle are oriented in the x and y directions), a contact (bus bar) to the upper electrically conductive layer at a position x=0, and a contact (bus bar) to the bottom electrically conductive layer at x=$x_t$, the relationship to provide a substantially uniform local cell potential is R'(x) =R(x)*($x_t$/x−1), where R(x) is the sheet resistance as a function of position of the top transparent conductive layer as a function of position and R'(x) is the sheet resistance as a function of position of the lower transparent conductive layer as a function of position, and where the sheet resistance of the upper and lower electrically conductive layers are substantially constant in the y direction for a given value of x. The sheet resistance of the top and bottom transparent conductive layers on flexible substrates can be tuned in various ways discussed herein in order to meet the above criteria, and provide a substantially uniform local cell potential. This will in turn mitigate the iris effect on electrochromic devices, including those manufactured on flexible substrates.

In addition to thickness, the bulk resistivity of the transparent conductive layer can also be varied to achieve a given horizontal sheet resistance profile. In some cases, the thickness of the layer can be substantially constant, and the electrical properties of the material varied to adjust the bulk resistivity. In TCOs, the doping density, crystallinity, composition or other material parameters are known to affect the bulk resistivity. Various deposition conditions, source materials and post-deposition treatments can be used to adjust the bulk resistivity and therefore adjust the horizontal sheet resistance. The materials, conditions and treatments can be varied horizontally to create a sheet resistance that varies as a function of horizontal position.

Figure 2:
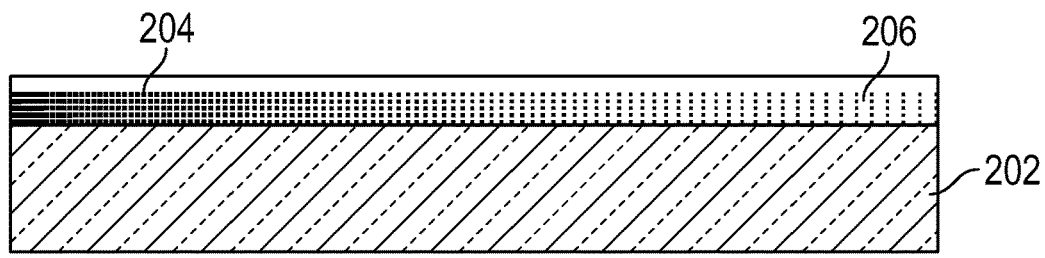
FIG. 2 is a cross-section view of a transparent conductive layer with horizontal sheet resistance varying by horizontal location, for an electrochromic device.

FIG. 2 is a cross-section view of a transparent conductive layer 204 with horizontal sheet resistance varying by horizontal location, for an electrochromic device. Although the transparent conductive layer 204 is depicted in FIG. 2 as a transparent conductive oxide (TCO) atop glass as a substrate 202, other transparent conductive layers and other substrates including flexible substrates can be used. Notches or spaces between portions of the transparent conductive layer 204 have varying spaces and varying widths. Equivalently, distinct portions of the transparent conductive layer 204 have varying widths and varying spacings. In another embodiment the variation can be created by scribing one of the transparent conductive layers so as to produce shorter resistive paths and longer resistive paths. A conductive or resistive layer 206, such as indium tin oxide (ITO), fills in the spaces between the distinct portions of the transparent conductive layer 204. In the embodiment shown, the conductive or resistive layer 206 is planar, although further embodiments can be formed with a less regular surface or other resistive material. Generally, the resistivity of the transparent conductive layer 204 and the resistivity of the conductive or resistive layer 206 differ, and the varied spacings and widths of each of the two materials produces a horizontal sheet resistance of the composite layer that varies according to horizontal location. Thus, although the mechanism employed in FIG. 2 differs from the mechanism employed in FIG. 1, embodiments based on these mechanisms produce related variation of the horizontal sheet resistance.

In the embodiment shown in FIG. 2, the horizontal sheet resistance has a gradient, from left to right in the drawing. If the layer 204 has a higher bulk resistivity than the layer 206, then the horizontal sheet resistance is higher at the left end of the structure in the drawing and lower at the right end of the structure in the drawing. If the layer 204 has a lower bulk resistivity than the layer 206, then the horizontal sheet resistance is lower at the left end of the structure in the drawing and higher at the right end of the structure in the drawing. This pattern can be repeated readily.

In some cases layer 204 and/or 206 can be made from a low temperature low sheet resistance transparent conductive material as described above. Some examples of the low temperature low sheet resistance transparent conductive material for the layer 204 and/or 206 are wire meshes, nanowire meshes, or particle coatings.

Figure 3:
FIG. 3 is an overhead view of patterning of the transparent conductive layer of FIG. 2.

FIG. 3 is an example of an overhead view of patterning of the transparent conductive layer 204 of FIG. 2. Dark areas depict the transparent conductive layer 204, and light areas depict the conductive or resistive layer 206. In this embodiment, a square or rectangular grid is used, although other shapes such as triangles, hexagons, circles, rectangles, or other regular or irregular geometric shapes in various ranges of sizes and spacings could be used. Patterns can be created from any shapes to change the relative fraction of materials, which will vary the sheet resistance. In some cases, the dimensions of the patterned shapes are sufficiently small that optical clarity of the final material is relatively unaffected as seen by the human eye.

In some cases, one layer of a composite transparent conductive layer in this disclosure (e.g, layer 204) can be made of islands that are physically separated from each other. In other cases, both layers of a composite transparent conductive layer in this disclosure (e.g., layers 204 and 206) can both be continuous and the features of each layer be connected by a thin film at the top or bottom of the layer. For example, layer 204 in FIG. 2 can be made continuous through in the inclusion of a thin layer adjacent to the substrate 202 connecting the depicted features. In the cases where layer 204 is discontinuous (i.e., composed of islands), then naturally the sheet resistance is measured by contacting the continuous film (e.g., layer 206 in FIG. 2).

Note for this example, and any other where patterns are included, the vertical sheet resistance and/or horizontal sheet resistance will vary considerably from point to point if measured at a location corresponding to a feature of one layer (e.g., taller region of layer 204) or to a spaces between features (e.g., spaces between layer 204 features), however, the vertical resistance will change in the described ways (e.g., higher, lower, or "U shaped") if averaged over a local area encompassing a few silicon dioxide islands.

Figure 4:
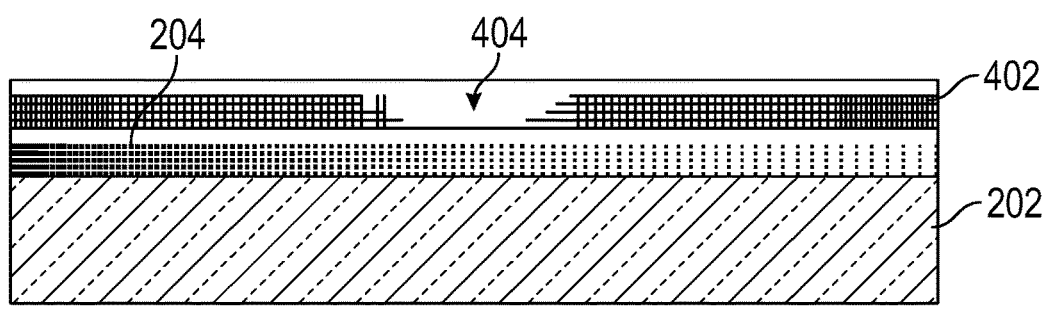
FIG. 4 is a cross-section view of a transparent conductive layer of uniform horizontal sheet resistance and vertical resistance, and a resistor layer with vertical resistance varying by horizontal location, for an electrochromic device.

FIG. 4 is a cross-section view of a transparent conductive layer 204 of uniform horizontal and vertical resistance, and a resistor layer 404 with vertical resistance varying by horizontal location, for an electrochromic device. This figure depicts glass as a substrate 202, but other substrates including flexible substrates can be used. A constant thickness of the transparent conductive layer 204 results in the uniform horizontal sheet resistance and uniform vertical resistance of the transparent conductive layer 204. An insulating layer 402, for example silicon dioxide as shown here, is patterned with varied spacings or gaps, and could also be patterned with various widths. The resistor layer 404 fills in the spacings between portions of the insulating layer 402. Resistivity of the resistor layer 404 is higher than resistivity of the transparent conductive layer 204, in the embodiment shown, so that the uniform resistivity of the transparent conductive layer 204 dominates the horizontal sheet resistance at various horizontal locations. Vertical resistance at various locations is dominated by the varied vertical resistance of the combination of the resistor layer 404 and the patterned insulating layer 402. For closer spacings of the portions of the insulating layer 402, or wider portions of the insulating layer 402, vertical resistance is greater, and for further apart spacings of the portions of the insulating layer 402, or narrower portions of the insulating layer 402, vertical resistance is lower. A profile of the vertical resistance of the structure in FIG. 4 goes from higher vertical resistance to lower vertical resistance to higher vertical resistance, in a "U" shape relative to horizontal location. In one embodiment, the profile of vertical resistance relative to horizontal location is parabolic.

Note for this example, and any other where patterns are included, the vertical sheet resistance and/or horizontal sheet resistance will vary considerably from point to point if measured at a location corresponding to a silicon dioxide island or to a location corresponding to the spaces between silicon dioxide, however, the vertical resistance will change in the described ways (e.g., higher, lower, or "U shaped") if averaged over a local area encompassing a few silicon dioxide islands.

Figure 5:
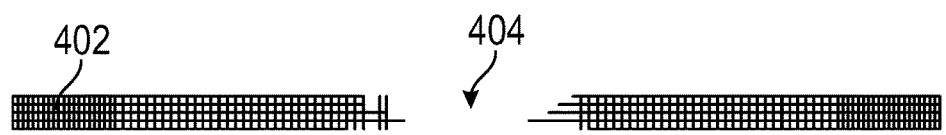
FIG. 5 is an overhead view of patterning of the insulating layer and resistor layer of FIG. 4.

FIG. 5 is an overhead view of patterning of the insulating layer 402 and resistor layer 404 of FIG. 4. The pattern is similar to that shown in FIG. 3, except that FIG. 5 depicts the insulating layer 402 as the dark regions and the resistor layer 404 as the light regions. As with FIG. 3, various geometric shapes, sizes of shapes, and spacings of shapes, can be used in various embodiments to pattern the insulating layer 402.

Figure 6:
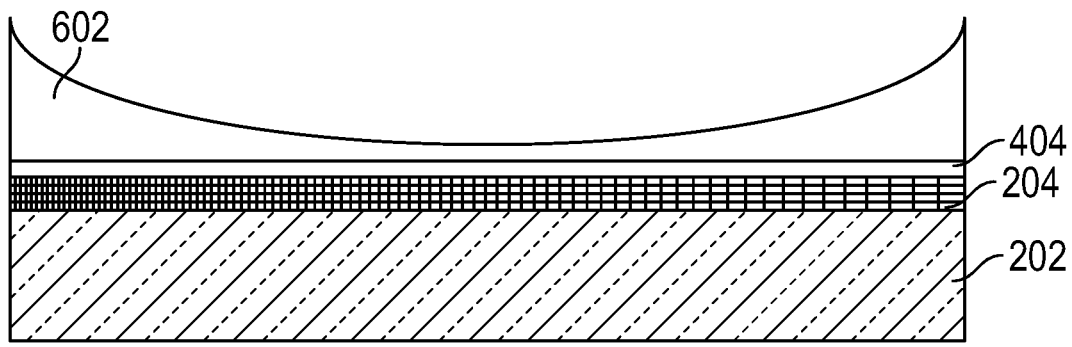
FIG. 6 is a cross-section view of a transparent conductive layer with horizontal sheet resistance varying by horizontal location as in FIG. 2, and a resistor layer with vertical resistance varying by horizontal location, as a variation of the structure shown in FIG. 4.

FIG. 6 is a cross-section view of a transparent conductive layer 204 with horizontal sheet resistance varying by horizontal location as in FIG. 2, and a resistor layer 602 with vertical resistance varying by horizontal location, as a variation of the structure shown in FIG. 4. This figure depicts glass as a substrate 202, but other substrates including flexible substrates can be used. In this example, the transparent conductive layer 204 is continuous (through a thin continuous layer of material adjacent to the substrate), and similar to FIG. 2 has varied widths and spacings, and a first resistor layer 404 fills in the spacings between portions of the transparent conductive layer 204. The resistivity of the transparent conductive layer 204 is less than the resistivity of the second resistor layer 602, the varied horizontal sheet resistance as described with reference to FIG. 2 dominates the horizontal sheet resistance profile of the structure depicted in FIG. 6. The bulk resistivity and the thickness of the second resistor layer 602 dominates the vertical resistance, in a manner related to that described with reference to FIG. 1. The structure of FIG. 6 thus allows tuning of the horizontal sheet resistance profile relative to horizontal location and tuning of the vertical resistance profile relative to horizontal location. Subject to certain limitations imposed by the bulk resistivity and thicknesses of the different layers, the tunings are essentially independent, in that thickness of the second resistor layer 602 can be controlled independently of the widths and spacings of the portions of the transparent conductive layer 204, or widths and spacings of portions of the first resistor layer 404. Thus, the embodiment shown in FIG. 6 has a profile of horizontal sheet resistance relative to horizontal location that is a gradient from left to right of lower lateral sheet resistance to higher lateral sheet resistance. And, the structure has a profile of vertical resistance relative to horizontal location that is "U" shaped, going from higher vertical resistance to lower vertical resistance, to higher vertical resistance, from left to right. In one embodiment (depicted in the figure), the profile of vertical resistance relative to horizontal location is parabolic. In other embodiments, the vertical resistance can vary hyperbolically across the device.

Figure 7:
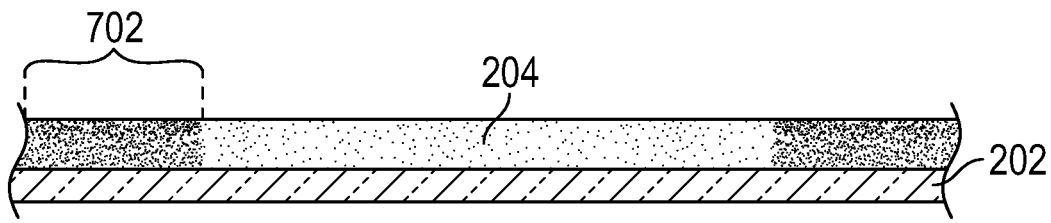
FIG. 7 is a cross-section view of a transparent conductive layer with horizontal sheet resistance varying by horizontal location according to concentration of conductive nanoparticles.

FIG. 7 is a cross-section view of a transparent conductive layer 204 with horizontal sheet resistance varying by horizontal location according to concentration of conductive nanoparticles 702. The matrix of the layer 204 can have a higher bulk resistivity (e.g., be an insulating polymer) than the conductive nanoparticles. Concentration of the conductive nanoparticles 702 could be varied by controlling a mixture in various ways. Where the concentration of conductive nanoparticles 702 is greater, resistivity is lower, and where the concentration of conductive nanoparticles 702 is lesser, resistivity is greater. In some structures, this may also affect vertical resistance, which could be further controlled by combining the embodiment of FIG. 7 with one of the mechanisms for controlling vertical resistance as described herein. In some cases the layer with varying concentration of conductive nanoparticles can be deposited on a flexible substrate. In some cases the layer with varying concentration of conductive nanoparticles can be deposited on a flexible substrate using roll-to-roll processing.

Figure 8:
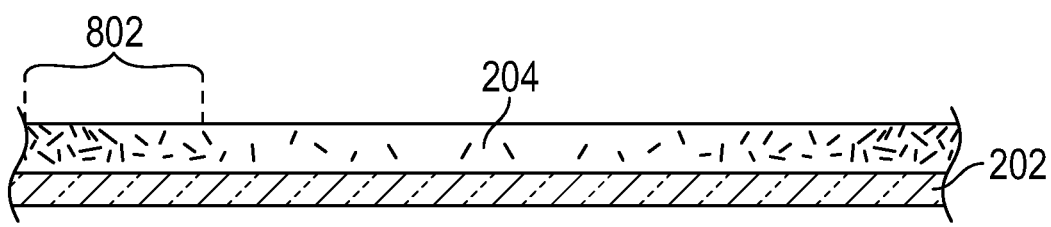
FIG. 8 is a cross-section view of a transparent conductive layer with horizontal sheet resistance varying by horizontal location according to concentration of conductive nanowires.

FIG. 8 is a cross-section view of a transparent conductive layer 204 with horizontal sheet resistance varying by horizontal location according to concentration of conductive nanowires 802. The matrix of the layer 204 can have a higher bulk resistivity (e.g., be an insulating polymer) than the conductive nanowires. Concentration of the conductive nanowires 802 could be varied by controlling a mixture in various ways. Where the concentration of conductive nanowires 802 is greater, resistivity is lower, and where the concentration of conductive nanowires 802 is lesser, resistivity is greater. This may also affect vertical resistance, which could be further controlled by combining the embodiment of FIG. 8 with one of the mechanisms for controlling vertical resistance as described herein. In some cases the layer with varying concentration of conductive nanowires can be deposited on a flexible substrate. In some cases the layer with varying concentration of conductive nanowires can be deposited on a flexible substrate using roll-to-roll processing.

Figure 9:
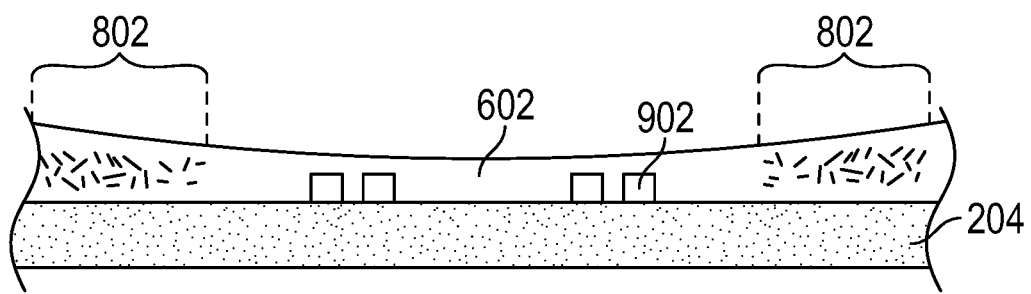
FIG. 9 is a cross-section view of a transparent conductive layer of uniform horizontal sheet resistance and vertical resistance and a resistor layer with vertical resistance and horizontal sheet resistance varying by horizontal location according to thickness of the resistor layer, concentration of conductive nanoparticles and placement of resistive or insulating material.

FIG. 9 is a cross-section view of a transparent conductive layer 204 of uniform horizontal sheet resistance and vertical resistance and a resistor layer 602 with vertical resistance and horizontal sheet resistance varying by horizontal location. Vertical resistance and horizontal sheet resistance of the resistor layer 602 varies according to thickness of the resistor layer 602, concentration of conductive nanowires 802 and placement and geometry of patterned resistive or insulating material 902. Illustrating one of many possible combinations of the materials and techniques described herein, the structure in FIG. 9 has control of the profile of the horizontal sheet resistance according to horizontal location, by varying thickness of the resistor layer 602, by varying placement, spacing and sizes of the resistive or insulating material 902 and by varying the concentration and placement of the conductive nanowires 802. Resistivity of the resistive or insulating material 902 can be varied, by employing various materials including monolithic structures, doped materials, composite materials etc. Control of the profile of the vertical resistance according to horizontal location is enacted by placement of these same materials and by thickness of the resistor layer 602. Various parameters, materials, combinations of materials, arrangements of materials and so on can be varied to control horizontal and vertical flow of electrons in electrochromic devices and control switching and steady states of transmissivity in these devices.

With reference to FIGS. 2-9, the relative resistivity and/or conductivity of the various materials applied in the patterns described can be varied. For example, a resistive or a conductive material could be substituted for an insulating material, a conductive material could be substituted for a resistive material or an insulating material, an insulating material could be substituted for a resistive material or a conductive material, or a material or concentration of a material that is more conductive or less conductive or more resistive or less resistive could be used, in various embodiments. Spacing, thickness, form factor (e.g. long and narrow, shorter and wider) and so on can be varied. In all cases, the combinations of layers and materials can be deposited on flexible substrates. In some cases, the combinations of layers and materials can be deposited on flexible substrates via roll-to-roll processing.

Figure 10:
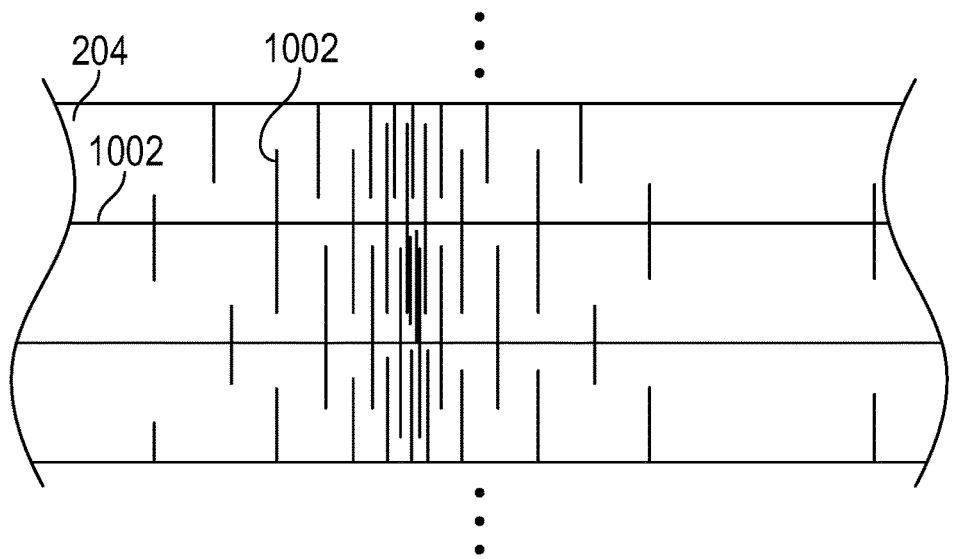
FIG. 10 is an overhead view depicting laser scribing on a transparent conductive layer, so as to vary horizontal sheet resistance by horizontal location.

FIG. 10 is an overhead view depicting laser scribing 1002 on a transparent conductive layer 204, so as to vary horizontal sheet resistance by horizontal location. The laser scribing 1002 is performed after depositing the transparent conductive layer 204, and could cut part way through or all the way through the transparent conductive layer 204. Spacing, depth of cut, length of cut and placements of cuts controls horizontal sheet resistance of the transparent conductive layer 204 by controlling path length that electrons travel. The pattern of laser scribing 1002 shown herein is an example, and other patterns are readily devised. More intricate patterns following desired contour lines, anisotropic control of resistance in various directions, etc., are possible. As described above, this could be combined with other structures. In some cases the size and spacings of the laser scribing 1002 should be small enough to avoid disturbing optical clarity of the final product. In all cases, the combinations of layers and materials and laser scribing patterns can be deposited on flexible substrates. In some cases, the combinations of layers and materials and laser scribing patterns can be deposited on flexible substrates via roll-to-roll processing.

Figure 11A:
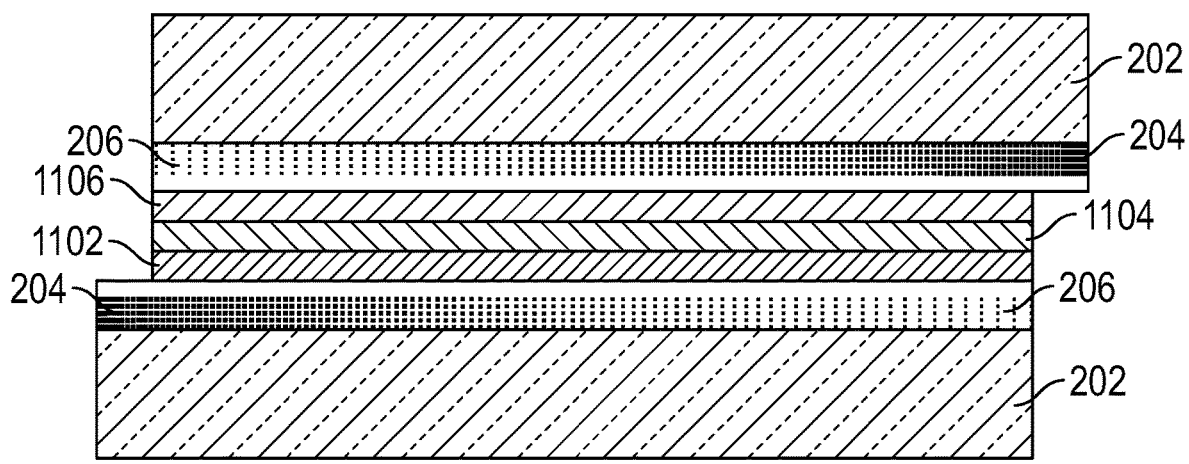
FIG. 11a is a cross-section view of a multilayer electrochromic device with opposed transparent conductive layers having complementary horizontal sheet resistance gradients, based on the structure depicted in FIG. 2.

FIG. 11a is a cross-section view of a multilayer electrochromic device with opposed transparent conductive layers 204 having complementary horizontal sheet resistance gradients, based on the structure depicted in FIG. 2. In order to pattern the structure of FIG. 11a for larger electrochromic devices such as an electrochromic window, a bus bar 110 (see FIG. 1) can be placed at the lower left in electrical contact with the lower transparent conductive layer 204, and a bus bar 112 (see FIG. 2) can be placed at the upper right in electrical contact with the upper transparent conductive layer 204 (providing that upper and lower layers 204 are continuous and conductive). The structure can be repeated by mirroring left to right, right to left, left to right, right to left etc. to form a continuous electrochromic stack. Although both substrates 202, i.e., the lower one of the substrates 202 and upper one of the substrates 202, are depicted in the drawing as made of glass, flexible substrates could also be used.

Starting at the bottom, the layers are as follows. A lower substrate 202 has a lower transparent conductive layer 204 patterned with a conductive or resistive layer 206 (a resistor layer, in the embodiment shown). This controls the profile of lateral sheet resistance relative to horizontal location, as in FIG. 2, producing a gradient of lateral sheet resistance.

On top of these layers, an anodic electrochromic material 1102, an ion conductive material 1104, and a cathodic electrochromic material 1106 are stacked. An upper conductive or resistive layer 206 (a resistor layer, in the embodiment shown) is patterned with an upper transparent conductive layer 204. This controls the profile of lateral sheet resistance relative to horizontal location, as in FIG. 2, producing a gradient of lateral sheet resistance, albeit of complementary or opposite slope to the gradient of the lateral sheet resistance of the lower transparent conductive layer 204. All of this is topped by a substrate 202. In this embodiment, the lower profile of lateral sheet resistance and the upper profile of lateral sheet resistance are complementary, in a manner similar to the lateral sheet resistances of the structure shown in FIG. 1. Likewise, repetition of the structure and the pattern of lateral sheet resistance variation relative to bus bars is related to that of FIG. 1. In other words, the region of the lower transparent conductive layer 204 with lower lateral sheet resistance (e.g., the lower left corner of FIG. 11a) is near a lower bus bar and opposite to a region of the upper transparent conductive layer 204 with higher lateral sheet resistance and no upper bus bar. A region of the lower transparent conductive layer 204 with higher lateral sheet resistance (e.g., the lower right corner of FIG. 11a) is away from any lower bus bar and opposite to a region of the upper transparent conductive layer 204 with lower lateral sheet resistance and an upper bus bar.

It should be appreciated that in this and further embodiments, these layers could be reversed, i.e., turned upside down with respect to the drawing. The structure is independent of gravity, or orientation of an electrochromic device relative to gravity, and can be constructed in various ways in various embodiments. Various structures can be made by sequential depositions, laminations, or combinations thereof.

Figure 11B:
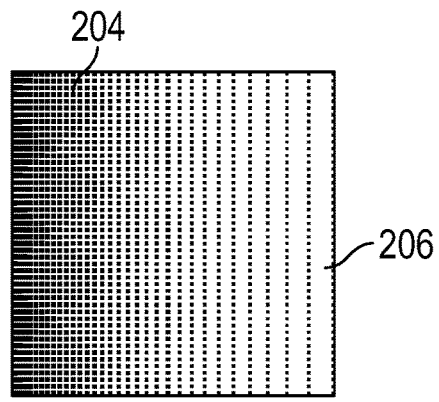

FIG. 11b is an overhead view showing patterning of the lower transparent conductive layer 204 and conductive or resistive layer 206 of FIG. 11a. Darker areas in the drawing depict the transparent conductive layer 204, and lighter areas depict the conductive or resistive layer 206 (e.g., resistor layer in the figure). Hexagons of varied sizes and spaces are employed in the pattern of layers 204 and 206, although other shapes, sizes and spaces could be used.

In alternative cases, the bus bars can be connected to the other layer in the transparent conductive composite layers. Namely, referring still to FIG. 11a, a bus bar 110 (see FIG. 1) can be placed at the lower left in electrical contact with the lower transparent conductive layer 206, and a bus bar 112 (see FIG. 2) can be placed at the upper right in electrical contact with the upper transparent conductive layer 206 (providing that upper and lower layers 206 are continuous and conductive).

In still other cases, the upper and lower transparent conductive layers could be patterned to create sheet resistance profiles that vary with horizontal position, similar to the structure depicted in FIG. 10. In these cases it would not be necessary to have a multiple layers making up the transparent conductive layers. The stack, including an anodic electrochromic material, an ion conductive material, and a cathodic electrochromic material, can be placed between the two transparent conductive layers, and the whole structure can be sandwiched between two flexible substrates.

Figure 12:
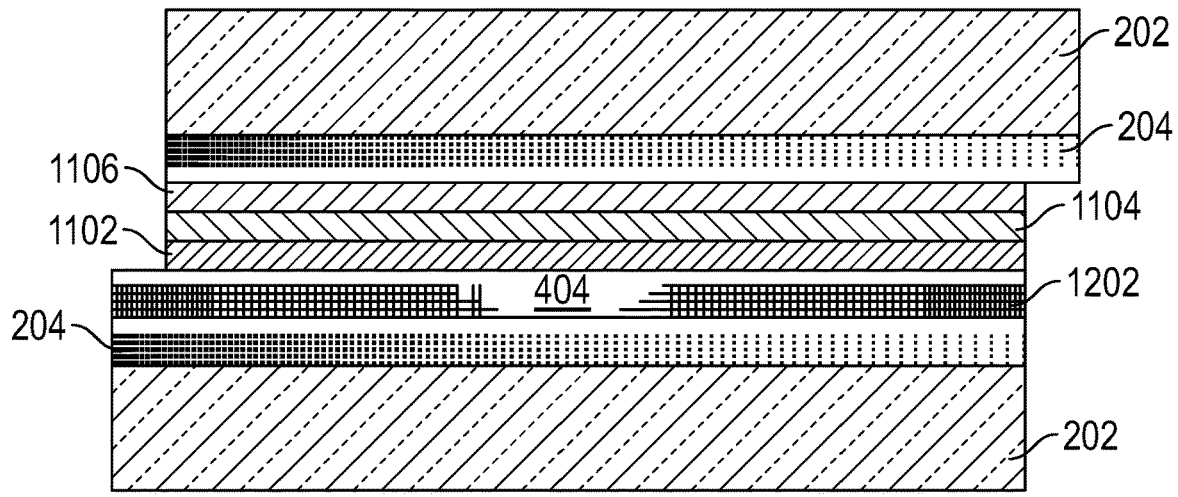
FIG. 12 is a cross-section view of a multilayer electrochromic device with transparent conducting layers of uniform horizontal sheet resistance and vertical resistance and two combined resistor layers with varied geometries that vary vertical resistance by horizontal location.

FIG. 12 is a cross-section view of a multilayer electrochromic device with transparent conducting layers 204 of uniform horizontal and vertical resistance and two combined resistor layers 1202, 404 with varied geometries that vary vertical resistance by horizontal location. The two combined resistor layers 1202, 404 establish a profile of vertical resistance relative to horizontal location that is "U" shaped, going from higher vertical resistance to lower vertical resistance, to higher vertical resistance, from left to right in the drawing. This is related to the structure depicted in FIG. 4, except that FIG. 4 applies an insulating layer 402 instead of the resistor layer 1202 in FIG. 12. Since the transparent conductive layers 204 are of uniform thickness, these establish profiles of horizontal sheet resistance that are constant with respect to horizontal location.

From bottom to top, the layers in the structure depicted in FIG. 12 are as follows. A substrate 202, which could be glass or a flexible substrate, has a first or lower transparent conductive layer 204 on top. This is followed by the combined resistor layers 1202, 404, with the vertical resistance profile as described above. Then, the anodic electrochromic material 1102, the ion conductive material 1104 and the cathodic electrochromic material 1106 are stacked up. Above that are an upper transparent conducting layer 204 and an upper substrate 202. Bus bar locations and repetition of the pattern are similar to those described when referring to FIG. 11a.

Figure 13:
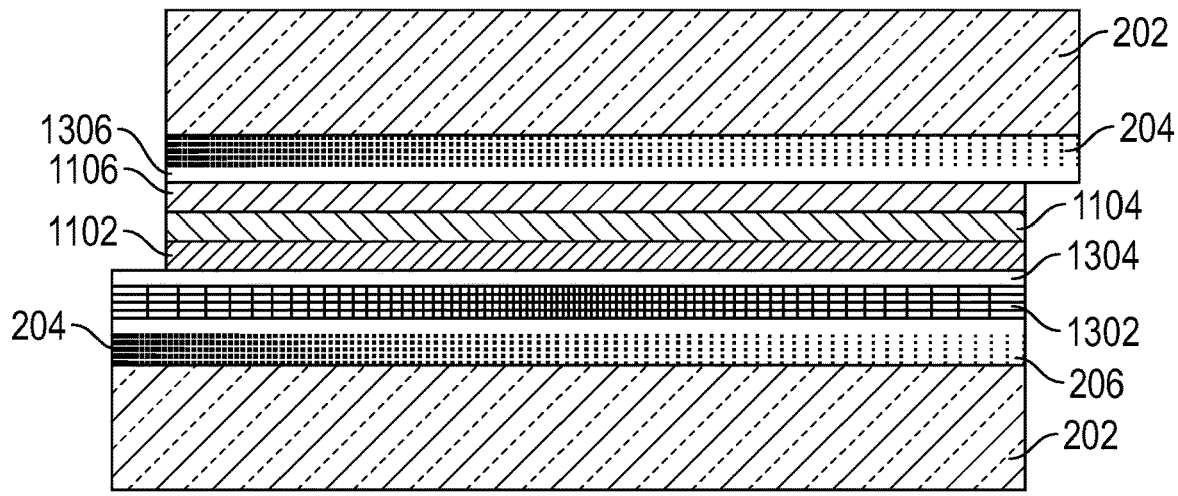
FIG. 13 is a cross-section view of a multilayer electrochromic device with opposed transparent conductive layers having complementary horizontal sheet resistance gradients and two combined resistor layers with varied geometries that vary vertical resistance by horizontal location.

FIG. 13 is a cross-section view of a multilayer electrochromic device with opposed transparent conductive layers 204 having complementary horizontal sheet resistance gradients and two combined resistor layers 1302, 1304 with varied geometries that vary vertical resistance by horizontal location. This embodiment combines features of the embodiment depicted in FIG. 11a, namely the two complementary transparent conductive layers 204, and features of the embodiment depicted in FIG. 12, namely the combined resistor layers 1302, 1304.

Starting at the bottom, the layers are as follows. The substrate 202, could be glass or a flexible substrate. The lower substrate 202 has a lower transparent conductive layer 204 patterned with a conductive or resistive layer 206 (a resistor layer, in the embodiment shown). This controls the profile of lateral sheet resistance relative to horizontal location, as in FIG. 2, producing a gradient of lateral sheet resistance. Then, two resistor layers 1302, 1304 are deposited and patterned so as to control vertical resistance relative to horizontal location, as a variation of the structure shown in FIGS. 4 and 12. These produce a "U" shaped profile of vertical resistance versus horizontal location, similar to the profile produced by the structure in FIG. 6 but through a differing mechanism.

On top of these layers, an anodic electrochromic material 1102, an ion conductive material 1104, and a cathodic electrochromic material 1106 are stacked. An upper conductive or resistor layer 1306 (a resistor layer, in the embodiment shown) is patterned with an upper transparent conductive layer 204. This controls the profile of lateral sheet resistance relative to horizontal location, as in FIG. 2, producing a gradient of lateral sheet resistance. All of this is topped by a substrate 202. Bus bar locations and repetition of the pattern are similar to those in FIG. 11a.

Electrochromic Devices on Flexible Substrates by Roll to Roll Processing

Next, flexible substrates and manufacturing techniques for producing electrochromic devices on flexible substrates are discussed. Particular emphasis is made of roll to roll processing, which can be economical for large volume production. Roll to roll processing is especially well suited to manufacturing layers and devices on flexible substrates.

By controlling the web (i.e., the roll) in various ways, materials in varied concentrations and thicknesses can be deposited on the substrate, giving rise to the desired characteristics of the materials. Especially, vertical resistance and horizontal sheet resistance of a material can be varied in the long direction along a web, in various embodiments described below.

Figure 14:
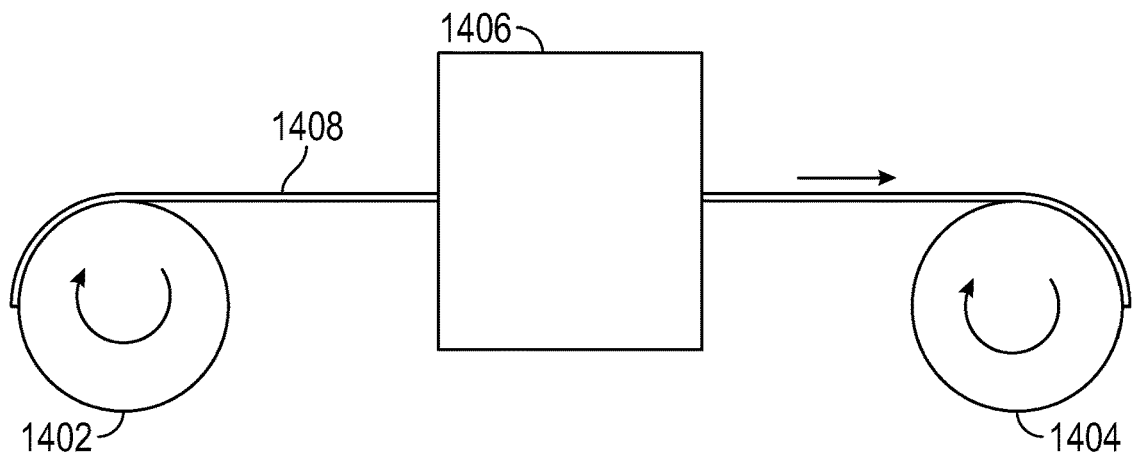
FIG. 14 is a side view of a roll to roll processing operation.

FIG. 14 is a side view of a roll to roll processing operation. Although roll to roll processing is generally known, processing techniques herein disclosed are applicable to roll to roll processing to produce the structures herein described. For example, the substrate 102 in various embodiments can be a flexible substrate, such as a web 1408, and various materials can be deposited on the web 1408 and processed so as to give rise to the features and devices shown in FIGS. 1-13, FIGS. 19 and 20, and FIGS. 21a and 21b. The web 1408 can travel from a first roller 1402, which unwinds the web 1408, through web processor 1406, to a second roller 1404, which rewinds the web 1408. The web processor 1406 could deposit the layers, for instance by sputtering (e.g., with a magnetron), PECVD (plasma enhanced chemical vapor deposition), web coating (e.g., solution coating), or other deposition processes. The web processes 1406 can form the patterns in deposited layers, for instance by photolithography, laser patterning, plasma etching or other wet or dry etch processes. The web processes 1406 can also selectively deposit layers in a pattern, for instance by sputtering through a shadow mask, or by solution coating through a die with shims. Various devices and processes suitable for the web processor 1406 to make various embodiments disclosed herein are described below. In many cases, multiple rollers (including and/or in addition to rollers 1402 and 1404) will be used to control tension of the web, and steer the web to keep it aligned through various processes 1406.

Figure 15:
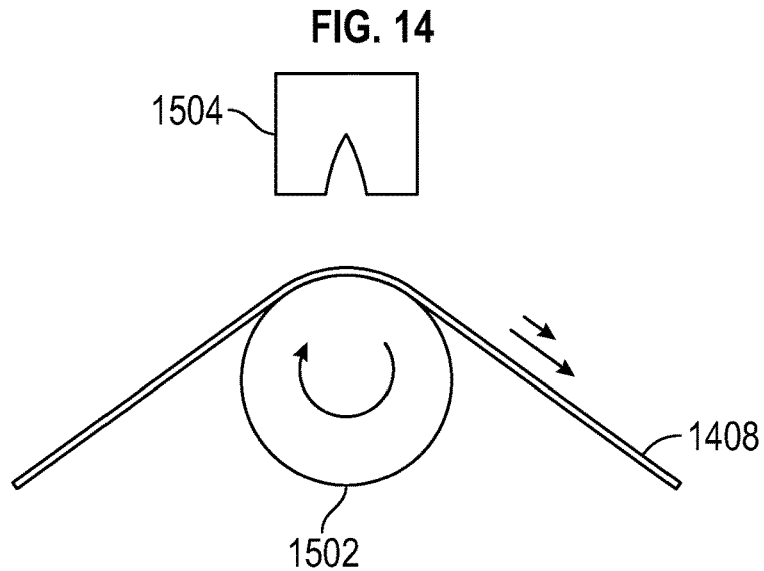
FIG. 15 is a side view of a roller moving a web at varied speeds below a material source head.

FIG. 15 is a side view of a roller 1502 moving a web 1408 at varied speeds below a material source head 1504. The material source head 1504 could be a spray nozzle, a deposition head, a material dispenser, a solution coating die, or other source that can deposit a material on the web 1408. Using this equipment, an electrochromic stack can be produced using a roll to roll process. In some cases the speed of the web (i.e. the speed of the roller) can vary throughout the process. Varying the speed of the roller 1502 and the web 1408, as depicted by the arrows of differing lengths, causes the amount of material or the concentration of the material to vary accordingly. For example, moving the web 1408 more slowly increases the amount of material or the concentration of the material deposited on the web 1408. In some cases, this technique could be used to control thickness of a transparent conductive layer 104 as in FIG. 1, or amount, concentration or density of nanoparticles 702 or nanowires 802 as in FIGS. 7 and 8, or spacing or width of various materials. Alternatively, pressure or flow rate or other control could be applied to the material source head 1504 to control rate at which material is deposited on the web 1408 moving at a constant speed. In yet other cases, magnet position, or power, or pressure, or process gas mixtures, or other process variables could control the deposition rate of a sputtering system, or change the electrical and/or optical properties of the deposited layer.

Figure 16:
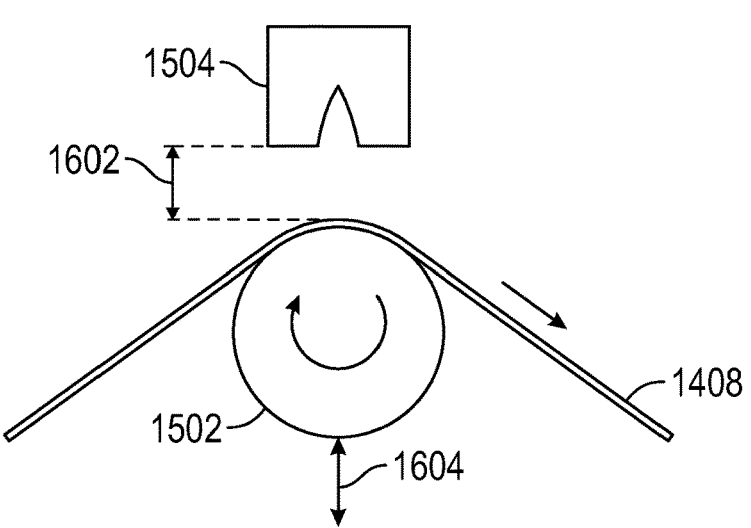
FIG. 16 is a side view of a roller moving vertically so as to vary spacing between a web and a material source head.

FIG. 16 is a side view of a roller 1502 moving vertically 1604 so as to vary spacing 1602 between a web 1408 and a material source head 1504. When the web 1408 is closer to the material source head 1504, material is deposited more densely or thickly, and when the web 1408 is further away, material is deposited less densely or thickly. This can be used to control thickness, or concentration as above. For instance, a physical deposition source or spray nozzle will deposit more material if the source is closer to the web.

Figure 17:
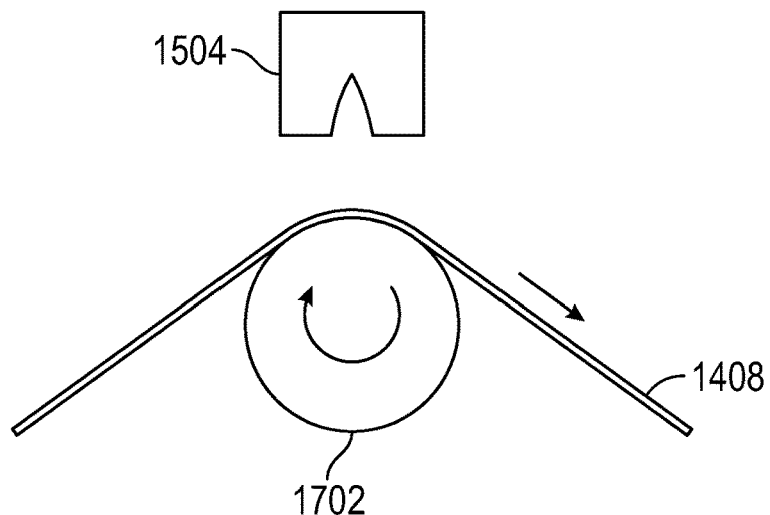
FIG. 17 is a side view of an oval roller that varies spacing between a web and a material source head.

FIG. 17 is a side view of an oval roller 1702 that varies spacing between a web 1408 and a material source head 1504. As in FIG. 16, this varied spacing can be used to control thickness, or concentration of materials or additives.

Figure 18:
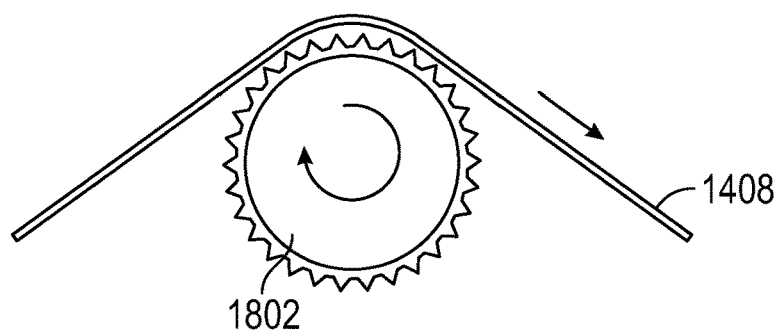
FIG. 18 is a side view of a patterning roller embossing a web.

FIG. 18 is a side view of a patterning roller 1802 embossing a web 1408. This could be used to control thickness of a material, or define resistive paths. The surface of the patterning roller 1802 would then define this thickness or these paths, either or both of which could be used to control horizontal sheet resistance or vertical resistance of a material in various locations.

Figure 19:
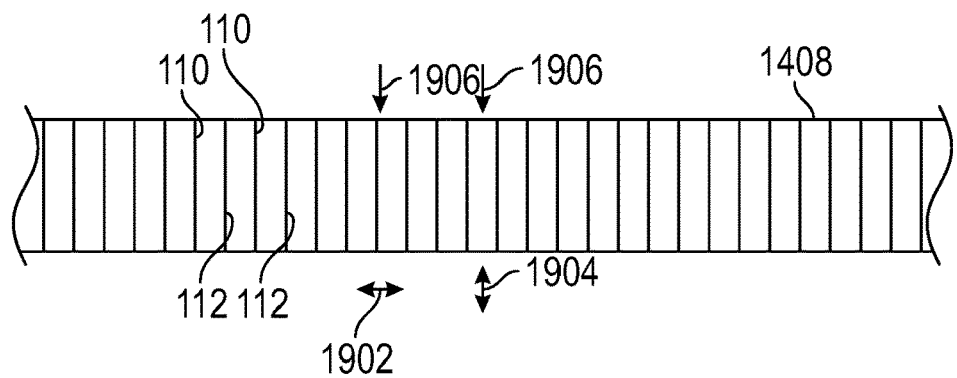
FIG. 19 is an overhead view of a web with bus bars lateral to the web.

FIG. 19 is an overhead view of a web with bus bars 110, 112 lateral to the web 1408. The lateral direction 1904 relative to the web is across the web, and is perpendicular to the longitudinal direction 1902 along the web. Cutpoints 1906 could be defined at bus bar locations, so that the web 1408 can be cut into window-sized sheets for making electrochromic windows. Each sheet could be adhered to glass or plastic to make an electrochromic window. In some embodiments, the bus bars are spaced apart by a spacing of one to twelve inches, inclusive. In other cases, the bus bars can be spaced apart by approximately 10 cm, 20 cm, 30 cm, 40 cm, 50 cm, 100 cm, 200 cm, 300 cm, 400 cm, 50 cm, 750 cm, 1000 cm, 1500 cm, 2000 cm, or from 10 to 100 cm, or from 100 to 500 cm, or from 100 to 1000 cm, or from 1000 to 2000 cm. Such a spacing could apply to bus bars of the same layer, or bus bars of opposed layers. This spacing may be closer than spacing applied to bus bars in embodiments of electrochromic glass, as result of the lower temperatures available during processing of the embodiments applied to flexible substrates. In some cases, the cutpoints can be very close to (but not through) bus bars 110 and 112, such that there is one bus bar on every substrate after cutting.

Figure 20:
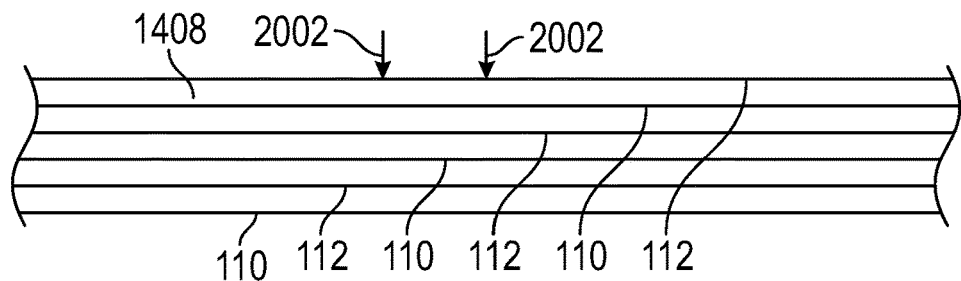
FIG. 20 is an overhead view of a web with bus bars longitudinal to the web.

FIG. 20 is an overhead view of a web 1408 with bus bars 110, 112 longitudinal to the web. Cutpoints 2002 could be defined at desired locations, so that the web 1408 can be cut into window-sized sheets for making electrochromic windows. As in FIG. 19, the spacing of bus bars is from one to twelve inches, inclusive, in some embodiments. In other cases, the bus bars can be spaced apart by approximately 10 cm, 20 cm, 30 cm, 40 cm, 50 cm, 100 cm, 200 cm, 300 cm, 400 cm, 50 cm, 750 cm, 1000 cm, 1500 cm, 2000 cm, or from 10 to 100 cm, or from 100 to 500 cm, or from 100 to 1000 cm, or from 1000 to 2000 cm.

Figure 21A:
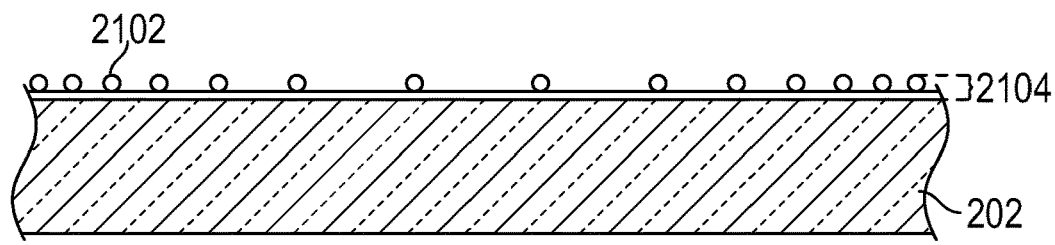
FIG. 21a is a cross-section view of a nanowire mesh on a substrate, with varied spacing of nanowires to establish a horizontal sheet resistance gradient.

FIG. 21a is a cross-section view of a nanowire mesh 2104 on a substrate 202, with varied spacing of nanowires 2102 to establish a horizontal sheet resistance gradient. In some embodiments, the substrate 202 is a flexible substrate suitable for roll to roll processing (e.g., PET). Closer spacing of (or smaller gaps between) nanowires 2102 results in lowered horizontal sheet resistance, and wider spacing of (or greater gaps between) nanowires 2102 results in raised horizontal sheet resistance. Thus, controlling the spacing or gaps between nanowires 2102 controls the horizontal sheet resistance and establishes the horizontal sheet resistance gradient. Narrower or thinner nanowires 2102 have generally higher resistivity than wider or thicker ones. In some cases, the mesh 2104 has nanowires in a random array, where the wires are substantially parallel with the surface of substrate 202. In one embodiment, the mesh 2104 has nanowires 2102 in a square or rectangular array, with a first group of the nanowires 2102 oriented in one lateral direction, and a second group of the nanowires 2102 oriented in another lateral direction approximately perpendicular to the first group. Other mesh arrangements such as hexagonal, triangular, rhomboid, etc., are readily devised in accordance with the teachings herein. In variations, the nanowire mesh 2104 could be of constant or uniform horizontal sheet resistance with respect to horizontal location, i.e., by having uniform spacing or gaps in uniform wire widths. A nanowire mesh 2104, in some embodiments, is made by depositing a transparent conductive layer, then depositing photoresist, and performing photolithography and etching to remove portions of the transparent conductive layer and leave the nanowire mesh 2104. In one embodiment, spacing between nanowires 2104 varies from about 30 to 50µ (microns) up to about 300µ.

Figure 21B:
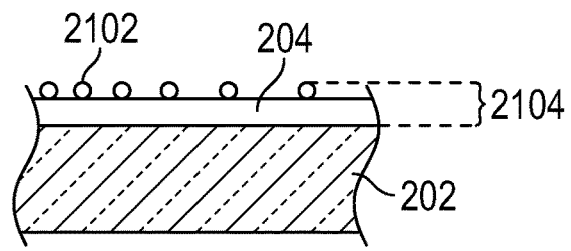
FIG. 21b is a variation of the structure of FIG. 21a, with the nanowire mesh atop a transparent conductive layer.

FIG. 21b is a variation of the structure of FIG. 21a, with the nanowire mesh 2104 atop a transparent conductive layer 204. The transparent conductive layer 204 has a uniform thickness and composition, and therefore a uniform horizontal sheet resistance independent of horizontal location on the transparent conductive layer 204. Placing the nanowire mesh 2104 on the transparent conductive layer 204 results in the overall structure of FIG. 21b having a generally lower horizontal sheet resistance than that of the structure in FIG. 21a, and still allows control of a horizontal sheet resistance gradient. In variations of the structures of FIGS. 21a and 21b, the nanowire mesh 2104 could be embedded in a transparent conductive layer 204. Further structures can be added atop the nanowire mesh 2104, such as the transparent conductive layer 204 with conductive nanoparticles 702 depicted in FIG. 7, or the transparent conductive layer 204 with conductive nanowires 802 depicted in FIG. 8. An electrochromic stack with a transparent conductive layer 204 and nanowire mesh 2104 as shown in FIG. 21b may change transmissivity more rapidly than one that uses the structure of FIG. 21a as a result of the lower overall resistance.

Figure 22:
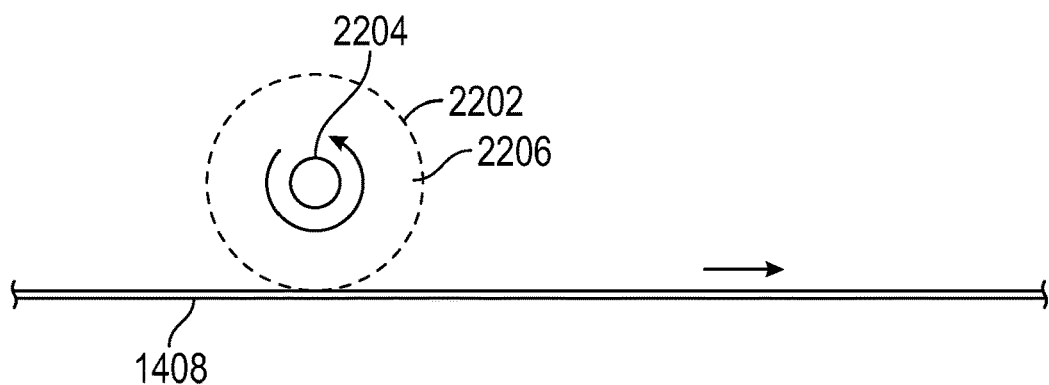
FIG. 22 is a side view depicting rolling photolithography applied to a web.

FIG. 22 is a side view depicting rolling photolithography applied to a web 1408. An ultraviolet light source 2204 within a patterned roller 2202 casts light through apertures 2206 of the patterned roller 2202. The patterned ultraviolet light then exposes a photoresist on a web 1408 traveling under (or over) the patterned roller 2202. Here, the patterned roller 2202 is a photolithography mask. Various dry or wet processes can be applied to remove the exposed (or unexposed) portions of photoresist, and then etch or otherwise remove, or add material onto the web 1408. Particularly, rolling photolithography can be used to produce various wire meshes or nanowire meshes, such as depicted in FIGS. 21a and 21b, and variations thereof. This may require the use of near field optics, as known in the art of photolithography. Also, rolling photolithography can be used to produce the resistor layer patterns depicted in FIGS. 2-6 and FIGS. 11a-13. A laser could also be applied to photolithography to create many of the structures described herein.

Figure 23:
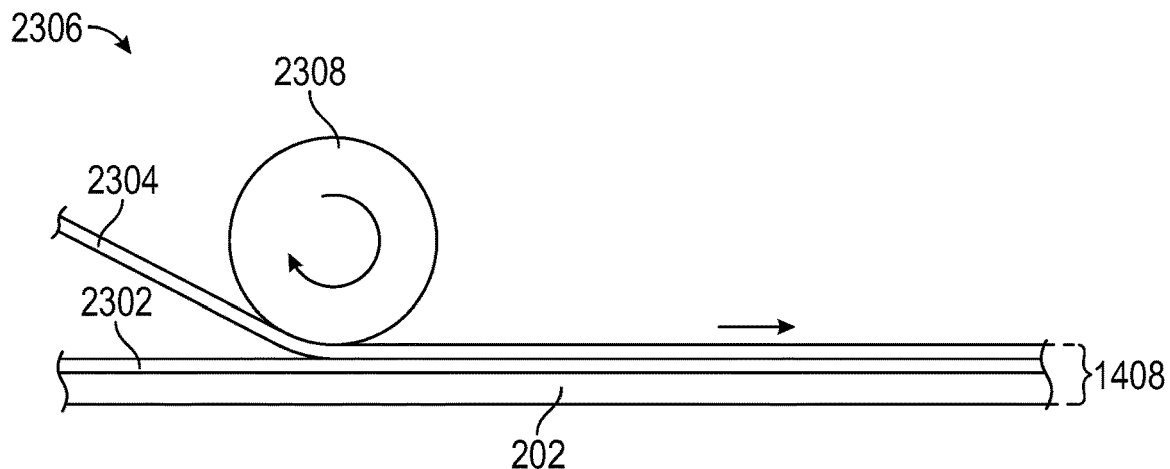
FIG. 23 is a side view depicting laminating in a roll to roll processing operation.

FIG. 23 is a side view depicting laminating 2306 in a roll to roll processing operation. A roller 2308 is applied to a moving web 1408. A substrate 202, in this example a flexible substrate with a first layer 2302 previously applied, meets a second layer 2304, which the roller 2308 presses onto the first layer 2302 and the substrate 202. For example, the substrate 202 with the first layer 2302 could be a PET flexible substrate coated with a transparent conductive layer, which could be uniform, patterned or varied, or have one or more other materials embedded. The second layer 2304 can be adhered to the first layer 2302 by a thermal process, or by application of a transparent conductive adhesive (e.g., with conductive particles or of conductive material). In one embodiment, the first layer 2302 includes a transparent conductive layer with a horizontal gradient of horizontal sheet resistance, and the second layer 2304 includes a transparent conductive layer with a horizontal gradient of vertical resistance. Roll to roll processing is well-known, and can produce various combinations of substrates 202 and layers 2302, 2304. Multilayer laminations and laminations of multilayer substrates and substrates with multiple layers applied by other roll to roll processes are readily achieved. Various embodiments and examples of electrochromic devices which could be produced by the roll to roll processes shown in FIGS. 14-23, and based on embodiments shown in FIGS. 1-13, are described below. It should be appreciated that further variations of these embodiments and examples can be produced.

In various embodiments, a complete electrochromic device starts with a substrate 202 that is flexible and suitable for web processing (e.g., a metal coated with an insulating layer, a polymer, or plastic material). A transparent conductive layer, which can be a transparent conductive oxide in some embodiments, is applied to the flexible substrate through either deposition or lamination, in a roll to roll process. In some embodiments, the transparent conductive layer is of uniform thickness and thus uniform horizontal sheet resistance (i.e., no gradient). In some embodiments the transparent conductive oxide is patterned and has a resistive or conductive material added, for example to form the structure with the layer that has the conductive layer 204 and the conductive or resistive layer 206 shown in FIG. 2, or the lower layer that has the transparent conductive layer 204 and the resistor layer 404 (atop the substrate 202) of FIG. 6, FIG. 11a or FIG. 13. This could be performed using rolling photolithography, or a stop and move roll to roll process with photolithography processing to momentarily stationary sections of a web 1408.

Embodiments with a uniform thickness transparent conductive layer could have a patterned resistor layer applied next, using rolling photolithography or the above-described stop and move roll to roll process, for example to form the structure shown in FIG. 4, and the resistor layer(s) 404, 1202 in FIG. 12. The embodiment shown in FIG. 13 could have patterned resistor layer(s) 1302, 1304 applied atop the earlier applied patterned resistor layer(s) 204, 404, using the rolling photolithography or stop and move roll to roll process. As an alternative, the above-described structures could have the resistor layer(s) applied by lamination. Any of these devices can then have an anodic electrochromic material 1102 layer, an ion conductive material 1104 layer, and a cathodic electrochromic material 1106 layer applied, by deposition, lamination, or a combination of these. An upper substrate 202 (e.g., a flexible upper substrate) with a uniform transparent conductive layer, which could be a transparent conductive oxide in some embodiments, can then be applied by lamination to the cathodic electrochromic material 1106 layer, or deposition, for example to produce the structure shown in FIG. 12 or variations thereof. An upper substrate 202 (e.g., a flexible substrate) could have a patterned resistor layer(s) 204, 206 produced on a web 1408, using rolling photolithography or a stop and move process, and this could then be applied by lamination to produce the structure shown in FIG. 11a. Similarly, an upper substrate 202 could have a patterned resistor layer(s) 204, 1306 produced on a web 1408, and this could be applied by lamination to produce the structure shown in FIG. 13. Variations of these structures could be produced "upside down", i.e., by starting with a flexible substrate at what is shown as the top of these diagrams.

In any of the above examples, a vertical resistance that has a gradient dependent upon horizontal location relative to the substrate 202 can be produced by materials processing as described above regarding FIGS. 6-9, as applied to a web 1408 in a roll to roll process. Lamination may be particularly useful to bring together two materials, one of which has a horizontal sheet resistance varying as a gradient with respect to horizontal location, and the other of which has a vertical resistance varying as a gradient with respect to horizontal location relative to a substrate. Combinations of depositions, processes, and laminating 2306 can produce further embodiments of the structures depicted in FIGS. 1-13.

To determine which ones of many possible combinations of features and parameter values produce optimal electrochromic devices, a parametric variation, experiment-based methodology can be devised and applied. For example, once dimensions (or a range of dimensions) for a desired electrochromic device are determined, samples can be prepared with structures that vary in one feature, or vary in one parameter value for a specified feature. These can be compared, and a next round of samples prepared that varies a differing feature or parameter. Two (or more) parameters or features can be varied in a matrix of samples, and this methodology allows rapid progress in terms of homing in on a desirable combination of features and parameter values. Economic analysis, durability analysis and defect analysis can be applied to determine which of multiple competing manufacturing techniques produces an optimal product with the desired features and parameter values at an optimal price. With the above methodology, variations in horizontal sheet resistance gradients and profiles, vertical resistance gradients and profiles, resistive, conductive or insulating materials, concentrations of these, and the various structures that apply each of these can be varied independently or in a matrix, and tuned in successive sample runs. In parallel, manufacturing techniques can be developed for promising features, with the parameters applied to sample runs.

Figure 24:
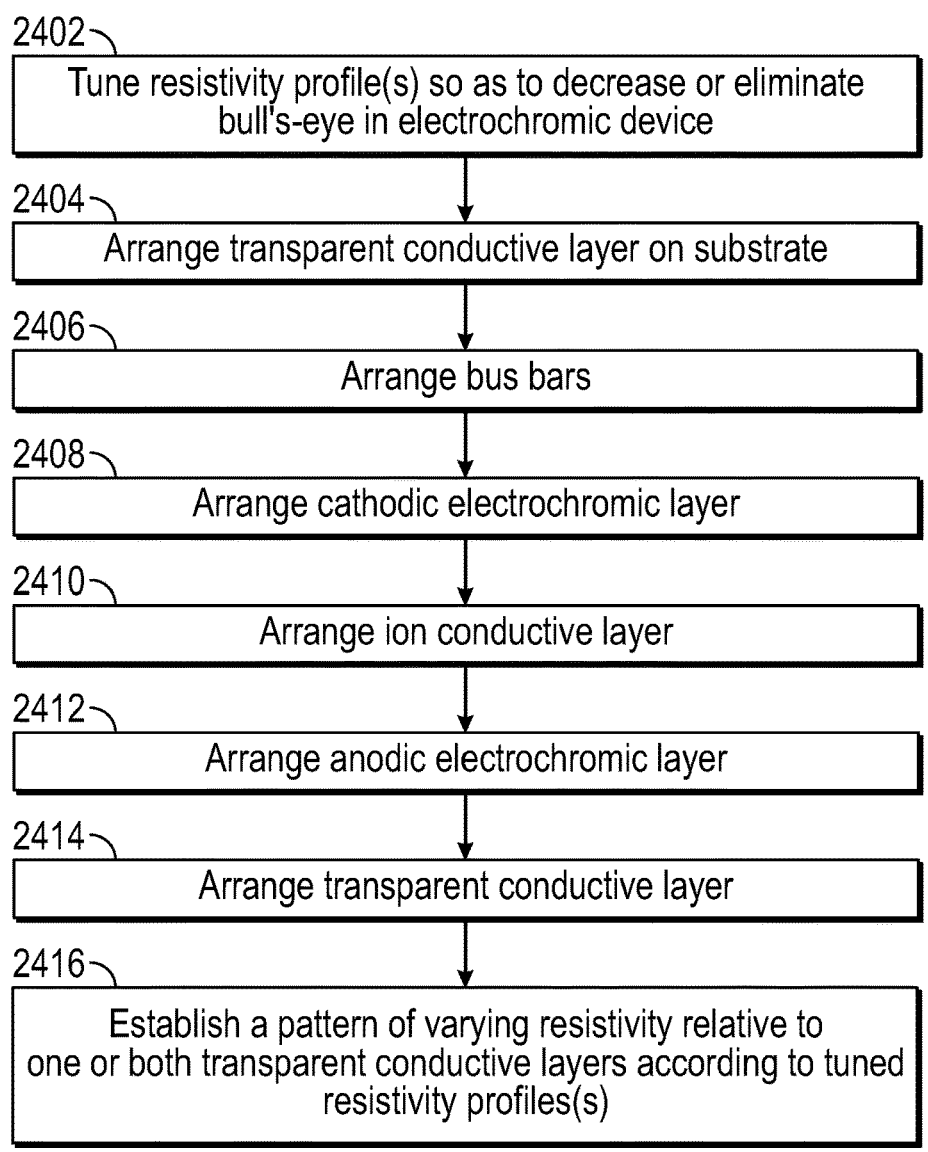
FIG. 24 is a flow diagram of a method of making an electrochromic device, including making one or more transparent conductive layers with varied sheet resistance.

FIG. 24 is a flow diagram of a method of making an electrochromic device, including making one or more transparent conductive layers with varied resistances. The method can be practiced on various substrates, including glass, hard plastics, webs, PET, and other flexible substrates.

One or more resistance profiles are tuned or determined so as to decrease or eliminate bull's-eye effect in an electrochromic device, in an action 2402. This can include tuning a profile of a horizontal sheet resistance of a material relative to horizontal location or position, tuning a profile of a vertical resistance of a material relative to horizontal location or position, or both. The tuning can be performed by simulation, or empirically by making batch lots with variations and determining which specimens have optimal performance, or both. A gradient profile for horizontal sheet resistance, opposed complementary gradient profiles for horizontal sheet resistance, and a "U" shaped profile for vertical resistance, in various combinations, are described herein as yielding reduction or elimination of bull's-eye effect.

A transparent conductive layer is arranged on a substrate, in an action 2404. Bus bars are arranged, in an action 2406. The bus bars in this lower section are electrically connected to the lower transparent conductive layer, and are spaced apart by a predetermined amount.

A cathodic electrochromic layer is arranged, in an action 2408. An ion conductive layer is arranged, in an action 2410. An anodic electrochromic layer is arranged, in an action 2412. In variations, one or more other electrochromic layers could be substituted.

A further transparent conductive layer is arranged, in an action 2414. This is the upper transparent conductive layer. These layers, the lower transparent conductive layer, the cathodic electrochromic layer, the ion conductive layer, the anodic electrochromic layer, and the upper transparent conductive layer could be reversed in sequence. Together, these form an electrochromic stack.

A pattern of varying horizontal sheet resistance and/or vertical resistance is established, relative to one or both transparent conductive layers, in an action 2416. This pattern is according to one or more tuned resistance profiles, as determined in the action 2402. Action 2416 could be performed in conjunction with action 2404 and/or action 2414, or could include an extra layer on top of or beneath one or both of the transparent conductive layers. The pattern of varying horizontal sheet resistance and/or vertical resistance could include varying horizontal sheet resistance and/or varying vertical resistance with respect to horizontal location or position.

Further bus bars can be arranged, as can a further substrate, in various embodiments. Arranging the various layers, materials, and patterns in the layers, can be based on the various embodiments disclosed herein, and can apply various methods for making the various layers, materials and patterns as disclosed herein.

OTHER CONSIDERATIONS

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An electrochromic device, comprising:
   a first flexible substrate, a first bus bar, a first transparent conductive layer, a first electrochromic layer adjacent to the first electrically conductive layer, and a second bus bar;
   wherein:
   the first electrically conductive layer is between the first substrate and the first electrochromic layer;
   the first bus bar and the second bus bar are electrically connected to the first electrically conductive layer; and
   the first transparent conductive layer includes a first horizontal sheet resistance having a gradient between the first bus bar and the second bus bar, wherein the first horizontal sheet resistance is lower near the first bus bar than at a midpoint between the first and second bus bars, and the first horizontal sheet resistance is lower near the second bus bar than at the midpoint between the first and second bus bars.

2. The electrochromic device of claim 1, further comprising:
   an ion conductive layer adjacent to the first electrochromic layer, a second electrochromic layer adjacent to the ion conductor layer, a second substrate, a second transparent conductive layer between the second electrochromic layer and the second substrate, a third bus bar, and a fourth bus bar;
   wherein:
   the third bus bar and the fourth bus bar are electrically connected to the second electrically conductive layer
   the second transparent conductive layer includes a second horizontal sheet resistance having a gradient between the third bus bar and the fourth bus bar, wherein the second horizontal sheet resistance is lower near the third bus bar than at a midpoint between the third and fourth bus bars, and the horizontal sheet resistance is lower near the fourth bus bar than at the midpoint between the third and fourth bus bars; and
   the gradient of the first horizontal sheet resistance is complementary to the gradient of the second transparent conductive layer.

3. The electrochromic device of claim 2, wherein the first horizontal sheet resistance has a decreasing gradient in a first direction and the second horizontal sheet resistance has an increasing gradient in the first direction.

4. The electrochromic device of claim 2, wherein the first transparent conductive layer and the second transparent conductive layer are each a composite of two or more transparent conductive materials.

5. The electrochromic device of claim 4, wherein one of the transparent conductive materials is a nanowire mesh that provides at least a portion of the gradient of the horizontal sheet resistance.

6. The electrochromic device of claim 2, wherein the first flexible substrate and the second flexible substrate comprises polyethylene terephthalate (PET).

7. The electrochromic device of claim 2, wherein the first flexible substrate and the second flexible substrate comprises a web capable of roll processing.

8. The electrochromic device of claim 2, wherein:
the first bus bar and the second bus bar are part of a set of first bus bars and the third and the fourth bus bars are part of a set of second bus bars, wherein the set of first bus bars is interleaved with the second set of bus bars.

9. The electrochromic device of claim 2, wherein the first electrically conductive layer and the second electrically conductive layer vary in thickness.

10. The electrochromic device of claim 2, wherein the first electrically conductive layer and the second electrically conductive layer are patterned to create the gradients in the first and second horizontal sheet resistances.

11. A method for making an electrochromic device on a substrate, comprising:
forming a first stack, comprising:
arranging a first transparent conductive layer on a first flexible substrate;
arranging a first set of bus bars in electrical contact with the first transparent conductive layer; and
arranging a first electrochromic layer in electrical contact with the first transparent conductive layer;
forming a second stack, comprising:
arranging a second transparent conductive layer on a second flexible substrate;
arranging a second set of bus bars in electrical contact with the second transparent conductive layer; and
arranging a second electrochromic layer in electrical contact with the first transparent conductive layer;
laminating the first stack to the second stack to form a laminated electrochromic device;
wherein, at least one of the first transparent conductive layer or the second transparent conductive layer comprises an electrical resistance gradient varied by horizontal location.

12. The method of claim 11, wherein temperatures during the method of making the electrochromic device are limited by a melting temperature of the flexible substrate.

13. The method of claim 11, wherein arranging the first electrochromic layer comprises:
arranging the first electrochromic layer in electrical contact with the first transparent conductive layer;
arranging an ion conductive layer in physical contact with the first electrochromic layer; and
arranging the second electrochromic layer in physical contact with the ion conductive layer.

14. The method of claim 11, wherein the varied electrical resistance includes horizontal sheet resistance that has a gradient in a horizontal direction parallel to the substrate.

15. The method of claim 11, wherein the varied electrical resistance includes vertical resistance that has a "U" shaped variation in a horizontal direction parallel to the substrate.

16. The method of claim 11, wherein the varied electrical resistance is formed by a process comprising:
varying a thickness of at least one of the first transparent conductive layer or the second transparent conductive layer.

17. The method of claim 11, wherein the varied electrical resistance is formed by a process comprising:
varying a concentration of conductive nanoparticles in at least one of the first transparent conductive layer or the second transparent conductive layer.

18. The method of claim 11, wherein the varied electrical resistance is formed by a process comprising:
varying a concentration of conductive nanowires in at least one of the first transparent conductive layer or the second transparent conductive layer.

19. The method of claim 11, wherein the varied electrical resistance is formed by a process comprising:
laser scribing one of the first transparent conductive layer or the second transparent conductive layer so as to produce shorter resistive paths and longer resistive paths.

20. The method of claim 11, wherein the varied electrical resistance is formed by a process comprising:
rolling a web over a roller that has a non-circular cross section so as to move the web closer to and further from a source of material for the first transparent conductive layer or the second transparent conductive layer, wherein the substrate is included in the web.

21. The method of claim 11, wherein varied electrical resistance is formed by a process comprising:
speeding up and slowing down a web so as to decrease and increase relative amounts of a source of material for the first transparent conductive layer or the second transparent conductive layer, wherein the web includes the substrate.

22. The method of claim 11, wherein varied electrical resistance is formed by a process comprising:
rolling a web over a patterned roller so as to emboss a varied pattern on the first transparent conductive layer or the second transparent conductive layer, wherein the web includes the substrate.

23. The method of claim 11, wherein the varied electrical resistance belonging to at least one of the first transparent conductive layer or the second transparent conductive layer is formed by a process comprising:
arranging a resistor layer in electrical contact with the at least one of the first transparent conductive layer or the second transparent conductive layer, the resistive layer having a profile of vertical resistance that varies in a direction parallel to the substrate.

24. The method of claim 11, wherein the varied electrical resistance is formed by a process comprising applying rolling photolithography.

25. The method of claim 11, wherein the varied electrical resistance in at least one of the first transparent conductive layer or the second transparent conductive layer includes a first profile having a first horizontal sheet resistance that has a first gradient with respect to horizontal location on the first transparent conductive layer, and includes a second profile having a second horizontal sheet resistance that has a second gradient with respect to horizontal location on the second transparent conductive layer, and wherein the first gradient is increasing where the second gradient is decreasing, or the first gradient is decreasing where the second gradient is increasing.

* * * * *